(12) United States Patent
Ghodrat et al.

(10) Patent No.: US 6,425,021 B1
(45) Date of Patent: Jul. 23, 2002

(54) SYSTEM FOR TRANSFERRING DATA PACKETS OF DIFFERENT CONTEXT UTILIZING SINGLE INTERFACE AND CONCURRENTLY PROCESSING DATA PACKETS OF DIFFERENT CONTEXTS

(75) Inventors: Fataneh F. Ghodrat; David A. Thomas, both of Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/192,891

(22) Filed: Nov. 16, 1998

(51) Int. Cl.[7] .................... G06F 13/14; G06F 13/16
(52) U.S. Cl. ................ 710/22; 710/20; 710/21; 710/27; 710/35; 710/305; 710/308
(58) Field of Search ................. 710/1, 22, 27, 710/35, 20, 21, 305, 308

(56) References Cited

U.S. PATENT DOCUMENTS

| | | | |
|---|---|---|---|
| 4,999,769 A | 3/1991 | Costes et al. ............. 364/200 |
| 5,003,465 A | 3/1991 | Chisholm et al. ......... 364/200 |
| 5,117,486 A * | 5/1992 | Clark et al. ............... 395/250 |
| 5,121,390 A | 6/1992 | Farrell et al. ............. 370/94.1 |
| 5,283,883 A | 2/1994 | Mishler .................... 395/425 |
| 5,305,319 A | 4/1994 | Sowell .................... 370/85.13 |
| 5,371,736 A | 12/1994 | Evan ........................ 370/79 |
| 5,404,539 A * | 4/1995 | Onozaki ................... 395/725 |
| 5,504,757 A | 4/1996 | Cook et al. ............... 370/84 |
| 5,592,629 A | 1/1997 | Gamble .................... 395/250 |
| 5,870,479 A * | 2/1999 | Feiken et al. ............. 380/49 |
| 5,915,127 A * | 6/1999 | Ogawa et al. ............. 395/878 |
| 5,941,953 A * | 8/1999 | Bergmann et al. ........ 709/234 |
| 6,032,190 A * | 2/2000 | Bremer et al. ............ 709/238 |

* cited by examiner

Primary Examiner—Jeffrey Gaffin
Assistant Examiner—Rehana Perveen
(74) Attorney, Agent, or Firm—Carstens, Yee & Cahoon, LLP

(57) ABSTRACT

A method and apparatus for processing data packets through direct memory access (DMA) in transferring data packets between a bus and an apparatus containing DMA engines. The DMA engines process different contexts, also referred to as distinct logical data streams. The phase of a bus along with the status of DMA transactions are monitored. The phase and the status are used to dynamically allocate priorities to the DMA engines to maximize the efficiency in processing data.

28 Claims, 5 Drawing Sheets

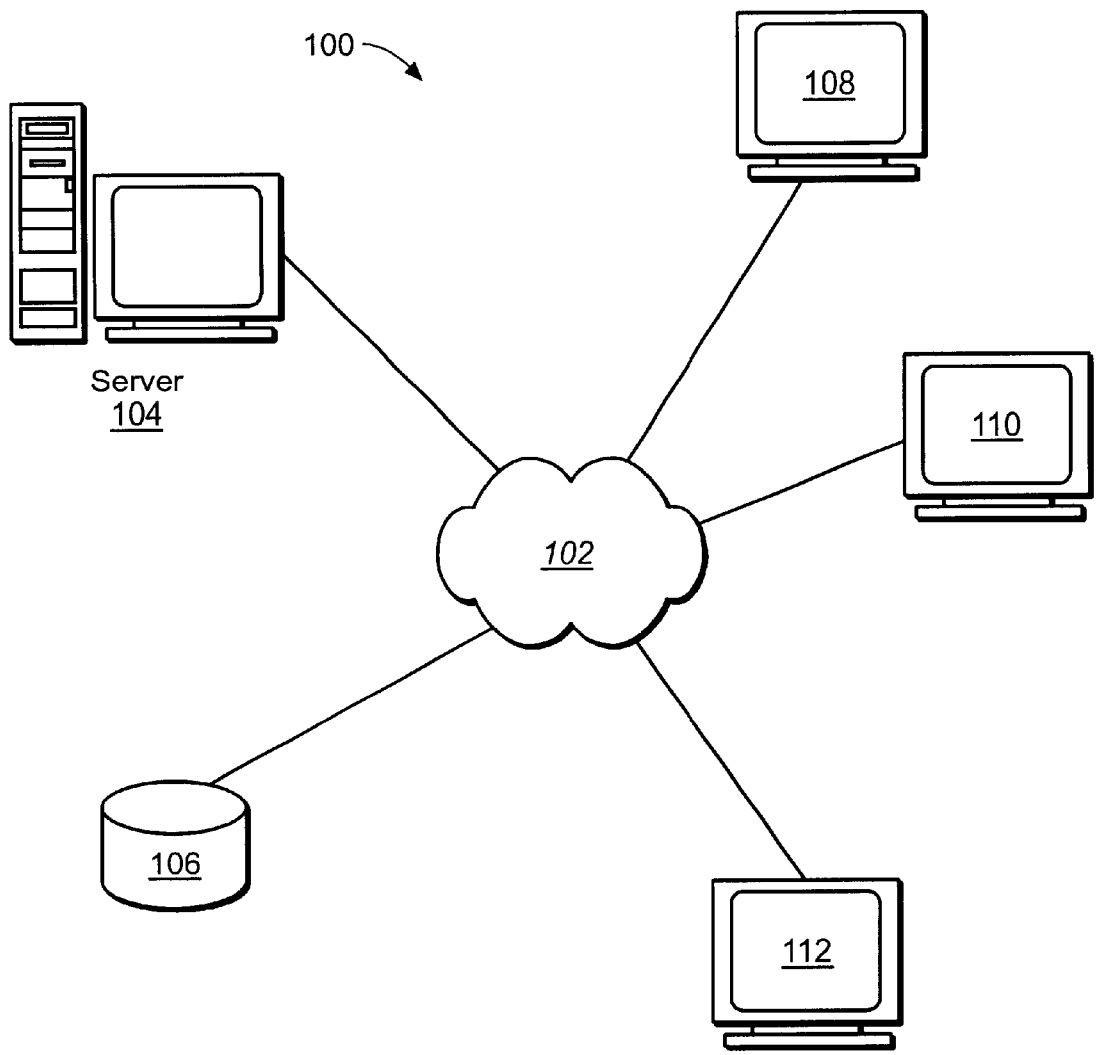
FIG._1

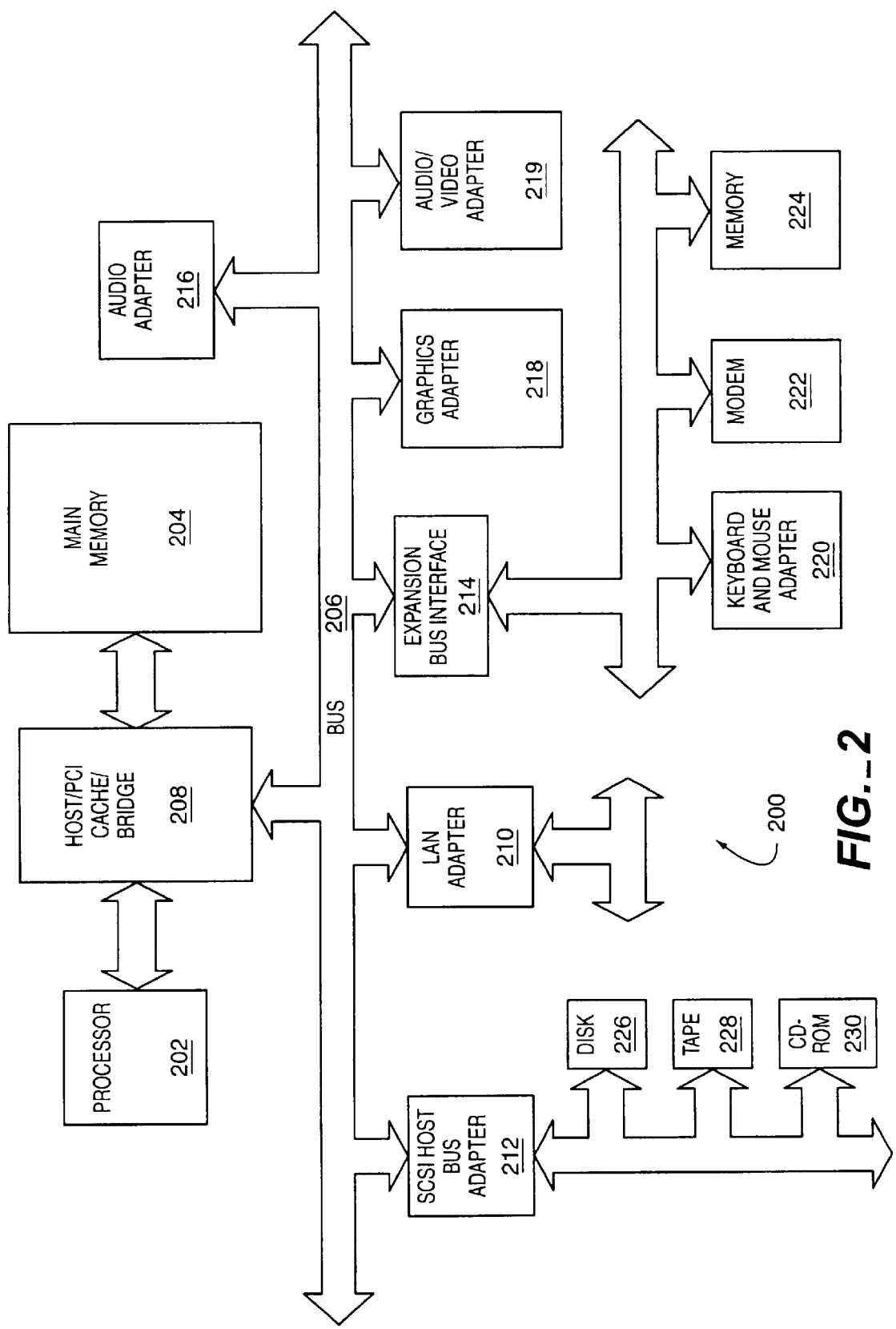
FIG._2

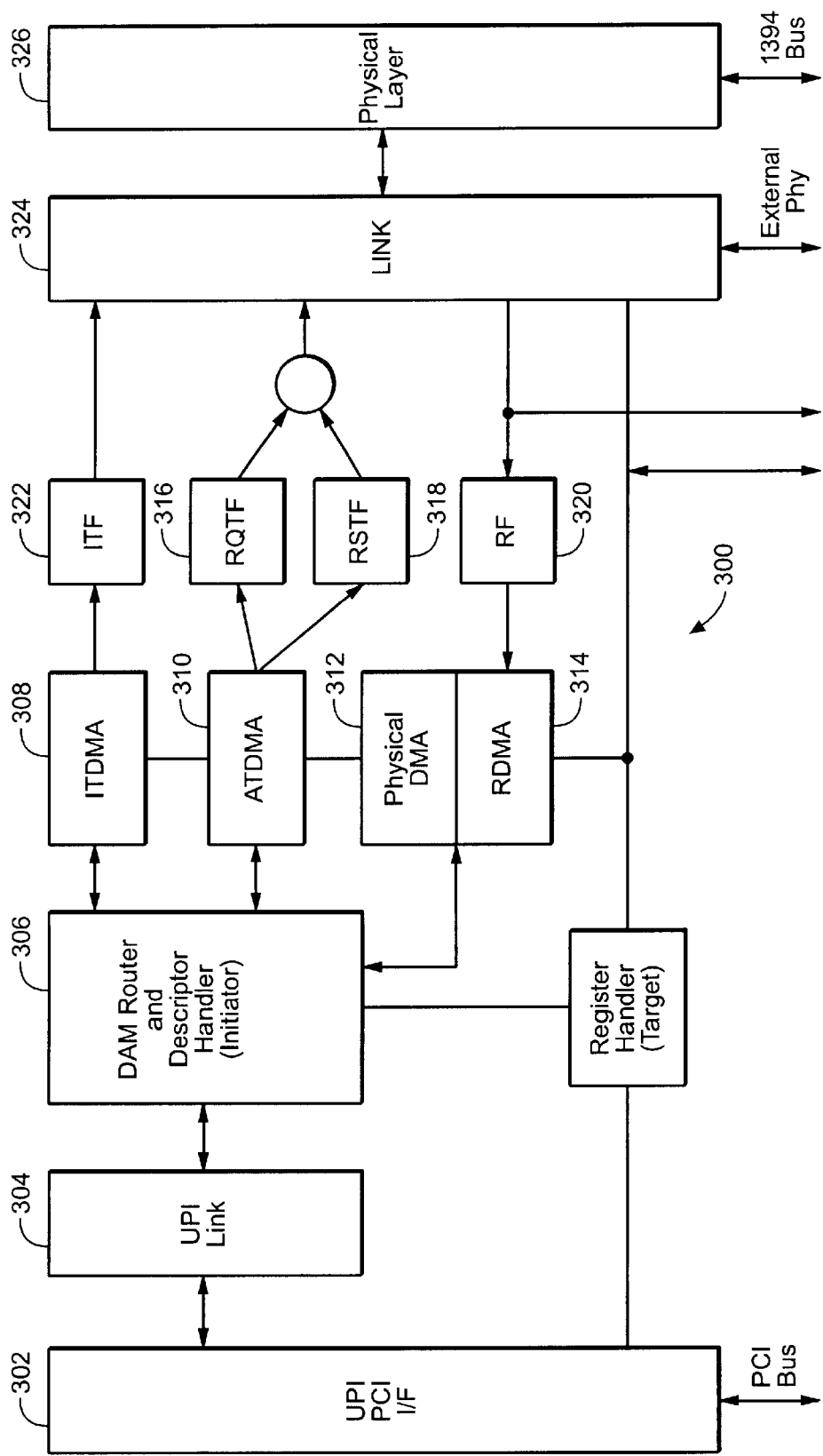
FIG._3

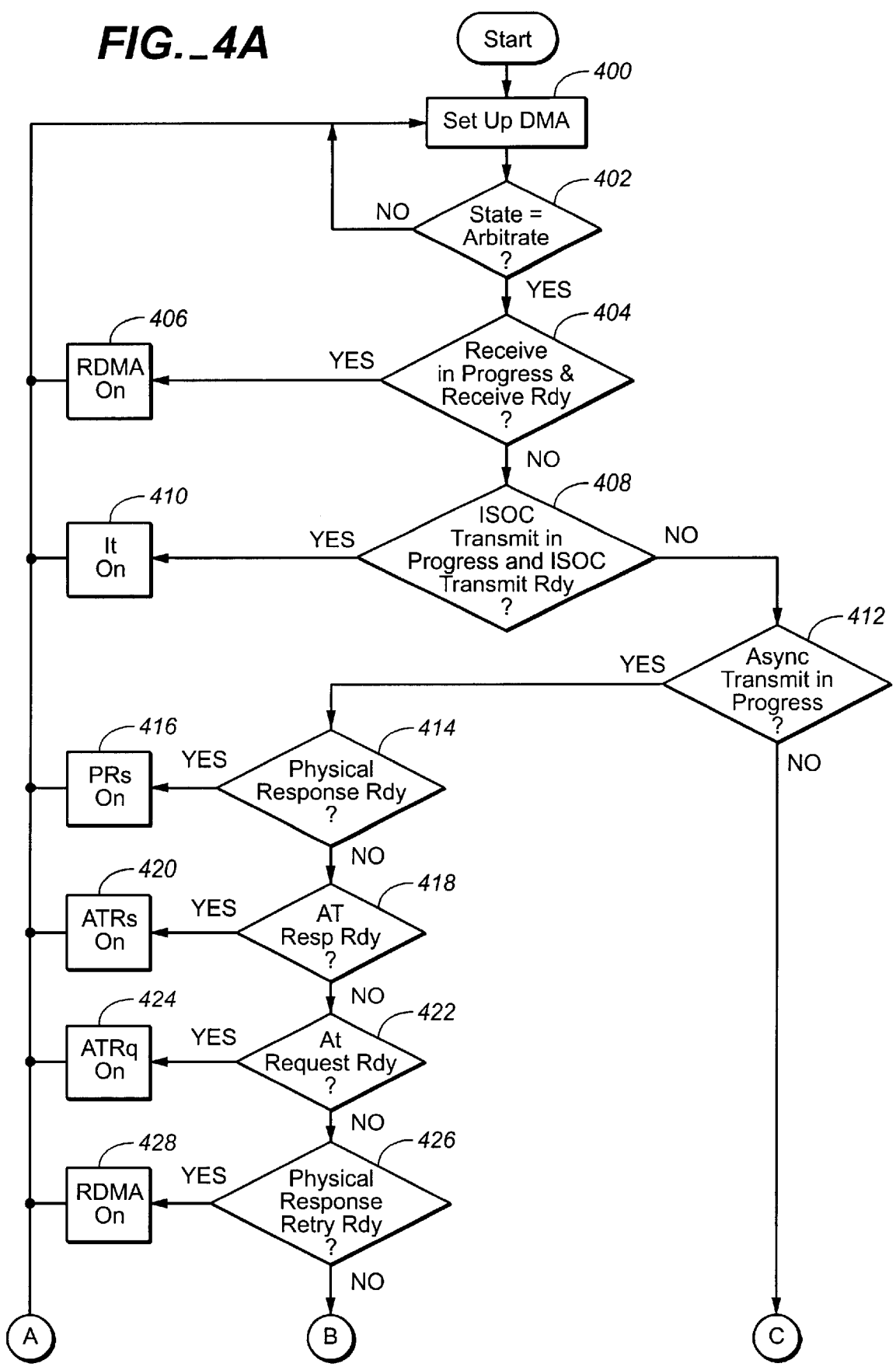
FIG._4A

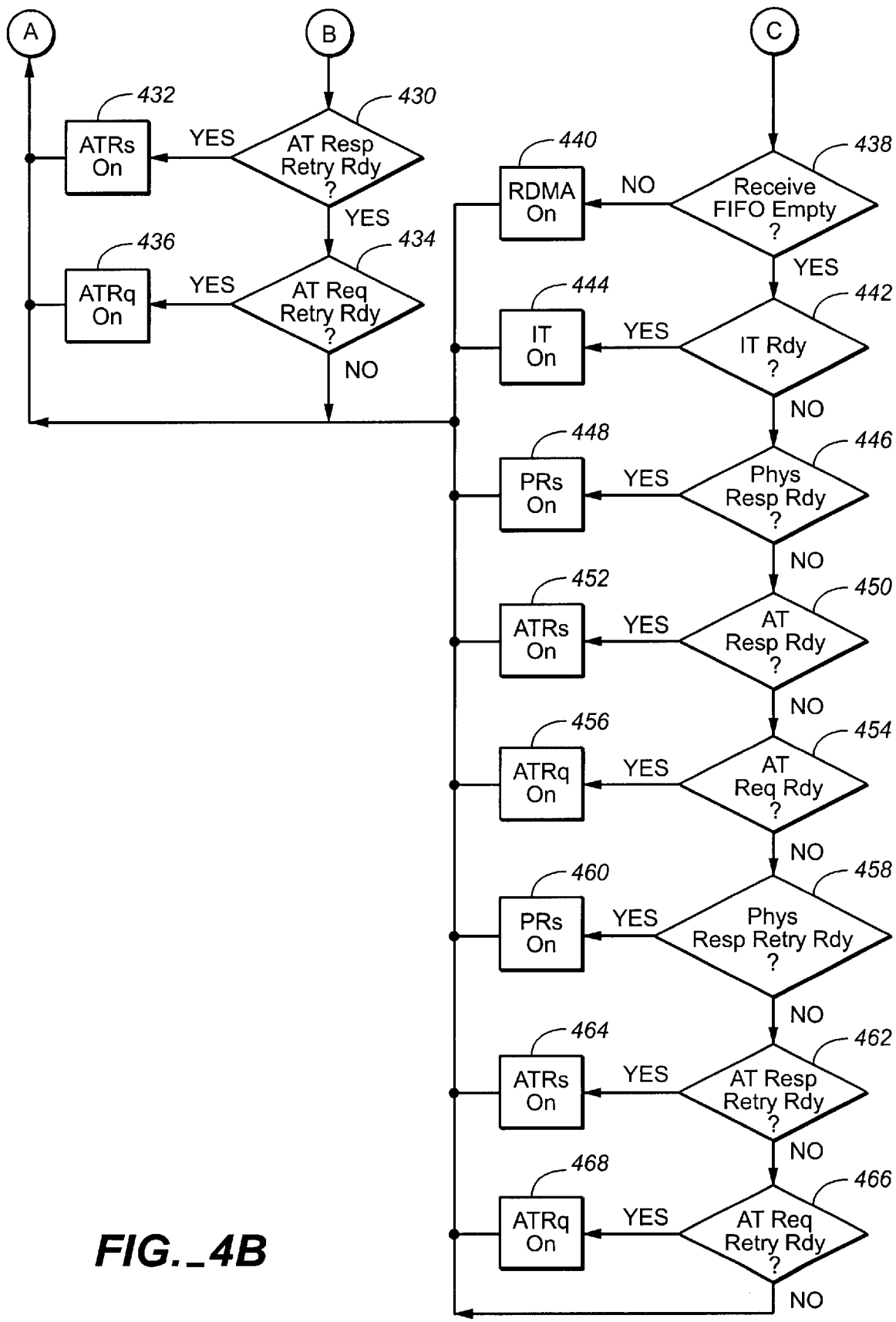
FIG._4B

SYSTEM FOR TRANSFERRING DATA PACKETS OF DIFFERENT CONTEXT UTILIZING SINGLE INTERFACE AND CONCURRENTLY PROCESSING DATA PACKETS OF DIFFERENT CONTEXTS

BACKGROUND OF THE INVENTION

1. Technical Field

The present invention relates generally to an improved data processing system, and in particular to a method and apparatus for transferring data. Still more particularly, the present invention provides a method and apparatus for multi-context direct memory access.

2. Description of the Related Art

Transmission of packets between data processing systems involves a number of steps. Data within a data processing system is collected through a feature, such as direct memory access (DMA). The data is assembled into a single packet and sent across a communications link to a target data processing system. The packet includes a header and a payload. The header includes information identifying the target, payload type, source, and various control data as specified by the protocol while the payload holds the data that is transmitted. When a packet is received at a data processing system, the packet is parsed to see if the packet is intended for the data processing system.

IEEE 1394 is an international serial bus standard. This standard provides a low cost digital interface that can be used for multimedia applications. Data may be transported at 100, 200, or 400 megabits per second as per the IEEE 1394-1995 Annex J Phys-Link Interface Specification. A 1394 serial bus supports two types of data transfer: asynchronous and isochronous. Asynchronous data transfer emphasizes delivery of data at the expense of no guaranteed bandwidth to deliver the data. Data packets are sent and an acknowledgment is returned. If a data defect is present, the packet can be resent. In contrast, iscochronous data transfer guarantees the data transmission bandwidth through channel allocation, but cannot resend defective data packets. This type of transfer is especially useful with multimedia data.

Currently, on a data processing system using the 1394 standard, a link, providing the interface to the 1394 serial bus, must parse a received packet to determine whether to accept the packet and whether to acknowledge acceptance of a packet. If the packet is accepted, the link places the packet into a buffer configured as a first-in-first-out (FIFO) buffer. On the other side of the FIFO buffer in the data processing system is a DMA engine that removes the packet and parses the packet in a manner similar to the link.

In currently available adapters used to move data between a host bus and a 1394 serial bus, DMA engines are phase dependent. When a device is in an isochronous phase, only isochronous DMA processes will function. In an asynchronous phase, only asynchronous DMA functions will process. As a result, presently available devices will not prepare an isochronous transmission during an asynchronous time or prepare an asynchronous transmission during an isochronous time period. This situation is not a major problem for an asynchronous period because an asynchronous transmission may occur during any idle time in the bus. Isochronous periods however terminate when the bus goes idle for a period called a subtraction gap. As a result, possible difficulties for isochronous transmissions may occur when the host bus is too busy to supply data to the isochronous transmit FIFO during an available window of an isochronous period. This is especially true if the only isochronous transmitter is the host device itself. In such a situation, the only time that the FIFO would be filled for the next isochronous cycle would be during the duration of a previous loaded packet plus the subtraction gap time. As a result, these bus phase dependencies reduce the efficiency and speed of data transfer.

Therefore, it would be advantageous to have an improved method and apparatus for transferring data in a data processing system in which multiple contexts are employed.

SUMMARY OF THE INVENTION

The present invention provides a method and apparatus for processing data packets through direct memory access (DMA) in transferring data packets between a bus and an apparatus containing DMA engines. The DMA engines process different contexts, also referred to as distinct logical data streams. The phase of a bus along with the status of DMA transactions are monitored. The phase and the status are used to dynamically allocate priorities to the DMA engines to maximize the efficiency in processing data.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a pictorial representation of a distributed data processing system in which the present invention may be implemented;

FIG. 2 is a block diagram of a data processing system in which the present invention may be implemented;

FIG. 3 is a block diagram of an adapter that provides a connection between a first bus and a second bus in accordance with a preferred embodiment of the present invention; and FIGS. 4A and 4B are flowcharts of a process for dynamically allocating priorities to various DMA engines in accordance with a preferred embodiment of the present invention.

DETAILED DESCRIPTION

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communication links between various devices and computers connected together within distributed data processing system 100. Network 102 may include permanent connections, such as wire or fiber optic cables, or temporary connections made through telephone connections. In the depicted examples, the medium includes a serial bus configured according to IEEE 1394.

In the depicted example, a server 104 is connected to network 102 along with storage unit 106. In addition, clients 108, 110, and 112 also are connected to a network 102. These clients 108, 110, and 112 may be for example, personal computers or network computers. For purposes of this application, a network computer is any computer, coupled to a network which receives a program or other application from another computer coupled to the network.

In the depicted example, server 104 provides data, such as boot files, operating system images, and applications to clients 108–112. Clients 108, 110, and 112 are clients to server 104. Distributed data processing system 100 may include additional servers, clients, and other devices not shown.

With reference now to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and serial bus adapter 219 are connected to PCI local bus 206 by add-in boards inserted into expansion slots. In the depicted example, serial bus adapter 219 is a 1394 serial bus employing IEEE 1394 standard. Serial bus adapter 219 provides a connection between PCI local bus 206 and a 1394 serial bus (not shown). The apparatus and processes of the present invention may be implemented within serial bus adapter 219. The LAN may be implemented as a serial bus architecture in the depicted example. In such a case, the processes of the present invention may be implemented in LAN adapter 210.

Expansion bus interface 214 provides a connection for a keyboard and mouse adapter 220, modem 222, and additional memory 224. SCSI host bus adapter 212 provides a connection for hard disk drive 226 tape drive 228, and CD-ROM 230 in the depicted example. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as NT Windows or OS/2. Windows NT is available from Microsoft Corporation, and OS/2 is available from International Business Machines Corporation. "OS/2" is a trademark of from International Business Machines Corporation. Instructions for the operating system and applications or programs arc located on storage devices, Such as hard disk drive 226 and may be loaded into main memory 204 for execution by processor 202.

Those of ordinary skill in the al t will appreciate that the hardware in FIG. 2 may vary depending, on the implementation. For example, other peripheral devices, such as optical disk drives and the like may be used in addition to or in place of the hardware depicted in FIG. 2. The depicted example is not meant to imply architectural limitations with respect to the present invention. For example, the processes of the present invention may be applied to multiprocessor data processing system.

Tuning next to FIG. 3, a block diagram of an adapter that provides a connection between a first bus and a second bus is depicted in accordance with a preferred embodiment of the present invention. Adapter 300 may be, for example, an adapter, such as serial bus adapter 219 or SCSI host bus adapter 212 in FIG. 2. Adapter 300 provides a connection between a first bus, such as PCI local bus 206 and a second bus, such as a serial bus. In the depicted example, adapter 300 is a serial bus adapter and includes a number of components used to provide an interface between PCI local bus 202 and a 1394 serial bus 204.

Adapter 300 includes a host bus interface 302. Host bus interface 302 acts as both a master and a slave on the host bus. Which is a PCI bus in the depicted example. As a slave, host bus interface 302 decodes and responds to register access within the adapter. As m a master, host bus interface 302 acts on behalf of direct memory access units within the adapter to generate transactions on the host bus. These transactions are used to move streams of data between system memory and the devices, as well as to read and write DMA command lists. PCI link 304 provides a mechanism to translate instructions and commands from the host to the DMA controller which is composed of several DMA engines and support logic. DMA router and descriptor handler 306 provides both arbitration and routing functions in the depicted example. DMA router and descriptor handler 306 takes requests from various DMA engines located in isochronous transmit DMA unit (ITDMA) 308, asynchronous transmit DMA unit (AT-DMA) 310, physical DMA unit 312, and receive DMA unit 314. These DMA units contain DANA engines in which each DMA engine can support at least one distinct logical data stream referred to as a "DMA context". A context is a DMA program that directs a DMA engine. Each asynchronous and isochronous context is comprised of a buffer description list called a DMA context program, stored in a memory. Buffers are specified within the DMA context program by DMA descriptors. Each DMA engine sequences through its DMA context program or programs to find the necessary data buffers. Such a mechanism frees the system from stringent interrupt response requirements after buffer completions.

In the depicted example, six DMA engines are present: an asynchronous transmit DMA, an asynchronous receive DMA, an isochronous transmit DMA, an isochronous receive DMA, a physical DMA, and a self-ID receive DMA. The asynchronous receive DMA is located within receive DMA (RDMA) unit 314 and contains two DMA contexts, a request handler and a response handler. The asynchronous receive DMA engine handles all incoming asynchronous packets not handled by one of the other functions in the asynchronous receive DMA. This engine includes two contexts, one for asynchronous response packets and one for asynchronous request packets. Each packet is copied into the buffers as described by a corresponding DMA program.

Asynchronous transmit DMA unit 310 includes two DMA engines, an asynchronous transmit DMA request engine and an asynchronous transmit DMA response engine. These two engines move transmit packets from the buffer in memory to corresponding FIFO units, such as request transmit FIFO 316 or response transmit FIFO 318. For each packet sent, an engine within asynchronous transmit DMA unit 310 waits for the acknowledge to be returned. If the acknowledge is busy, the DMA context may resend the packet up to some set number of times. This number may he set by software or may be hard wired within the system.

Receive DMA unit 314 includes an asynchronous receive DMA engine and an isochronous DMA engine that supports two contexts, a request handler and a response handler. Each packet is copied into a buffer described by a cot-responding DMA program.

Isochronous transmit DMA unit 308 contains an isochronous transmit DMA engine that supports four isochronous transmit DMA contexts. Each context is used to transmit data for a single isochronous channel. Data can be transmitted from each isochronous DMA context during each isochronous cycle.

An isochronous receive DMA engine located within receive DMA unit 314 may support four isochronous receive DMA contexts. Although the depicted embodiment uses four isochronous transmit DMA contexts, other numbers of isochronous transmit and receive DMA contexts may be implemented, such as, for example, up to 32 in an open host controller interface (OHCI), a standard programming interface model for 1394 host controllers. Each isochronous receive DMA context can receive packets from a single channel. One context may be used to receive packets from multiple isochronous channels. Isochronous packets in receive FIFO 320 are processed by the context configured to receive the respective isochronous channel numbers. Each DMA context may be configured to strip packet headers or include headers and trailers when moving packets into the buffers. Furthermore, each DMA context may be configured to concatenate multiple packets into its buffer in host memory 204 or to place just a single packet into each buffer. The multiple placement of buffers is referred to as a buffer fill mode while the placement of a single packet is referred to as a packet-per-buffer mode.

A physical DMA (PDMA) engine is found within physical DMA unit 312. The physical DMA engine handles read and write requests automatically without descriptor based processing. Read requests are automatically generated in a split transaction. A "complete" acknowledge is sent to all accepted physical write requests handled since no response packets are needed. A physical request is addressed to the lower 4 GB of memory. It can be automatically handled because that memory address is used as the physical memory address in host memory 204. If the packet is a read request, the PDMA creates a response packet with the requested data and transmits the packet. If the request is a write request, the PDMA engine transfers the packet data to the specified physical memory location.

A self-ID received DMA engine is found within receive DMA unit 314. Self-ID packets, which are received during bus initialization in the self-ID phase are automatically routed to a single designated host memory buffer by the self-ID received DMA. Each time bus initialization occurs, the new self-ID packets are written into the self-ID buffer from the beginning of the buffer, overwriting the old self-ID packets. Self-ID packets received outside of bus initialization are treated as asynchronous received DMA packets, but no acknowledgment is sent. The self-ID packets are physical packets and contain no destination information unlike physical, isochronous, or asynchronous packets.

Isochronous transmit FIFO 322 is a temporary storage for isochronous transmit packets. Isochronous transmit FIFO 322 is filled by isochronous transmit DMA unit 308 and is emptied by link 324.

Asynchronous transmit FIFO 316 and asynchronous transmit FIFO 318 are temporary storage units for non-isochronous packets that will be sent to various nodes on the serial bus. A asynchronous request transmit FIFO 316 is loaded by an asynchronous request DMA controller within asynchronous transmit DMA unit 310. An asynchronous response transmit FIFO 318 is loaded by an asynchronous response DMA controller within asynchronous transmit DMA unit 310. These two asynchronous transmit FIFOs, asynchronous transmit FIFO 316 and asynchronous transmit FIFO 318, are employed to prevent pending asynchronous requests from blocking asynchronous responses.

Receive FIFO 320 is employed to handle incoming asynchronous requests, asynchronous responses, isochronous packets, and self-ID packets. This FIFO is employed as a staging area for packets that will be routed to an appropriate receive DMA controller.

Adapter 300 also includes a physical layer device 326 which transmits and receives a serial string, of data. Physical layer device 326 includes a layer that translates the parallel data used by a link layer into high speed serial signals on the serial bus media in the depicted example. Physical layer device 326 guarantees that only one node at a time is sending data (result of bus arbitration). Physical layer device 326 also propagates tree topology information and provides data synchronization. Link 304 in adapter 300 communicates data and control information between the physical layer and transaction or application layers regarding asynchronous and isochronous packets and physical device configuration. This data includes data transfer, confirmation, addressing, and data checking. The link layer defines how information is to be transported on the physical layer from the transaction layer. The physical layer denes the behavior at the physical bus. The transaction layer defines operation between nodes, and the application layer defines the interface between the user and the transaction layer.

Link 324 sends packets, which appear at the various transmit FIFO interfaces and places correctly addressed packets into the receive FIFO from the bus. In addition, link 324 generates appropriate acknowledgments for all asynchronous receive packets. In addition, link 324 will detect missing start packets and generate and check 32-bit CRC. Physical layer device 326 provides an interface to the bus.

With reference next to FIGS. 4A and 4B, a flowchart of a process for dynamically allocating priorities to various DMA engines is depicted in accordance with a preferred embodiment of the present invention. The process illustrated in FIGS. 4A and 4B removes various bus phase restrictions by dynamically allocating priorities to various DMA engines within an adapter. As a result, host bus latencies will have less impact on isochronous transmissions than in presently available architectures. In addition, this process allows for several DMA engines to fill all of the transmit FIFOs instead of a serial operation in which one packet must be completed into the FIFO before another DMA engine may begin fetching data. In this manner, FIFO requirements are minimized. As a result, the present invention allows for a tolerance for host bus latencies with a minimum FIFO requirement.

When a FIFO becomes full, the priority scheme illustrated in this flowchart allows a DMA engine to shift to another pending DMA action. Thus, all transmitter FIFOs may be filled while waiting for the serial bus to be granted. In the depicted example, multiple isochronous contexts are assigned a fixed priority and requests from them are treated in an OR function for global isochronous transmit requests or a global isochronous receive request.

The process begins by setting up the DMA engines (Step 400). A determination is then made as to whether the state is equal to arbitrate (Step 402). Arbitration commences when any DMA engine is configured and its ready status is asserted. If the state is not equal to arbitrate, the process returns to Step 400. Such a state indicates that no DMA engines are present or ready for processing data. Otherwise, the process determines whether a receive in progress signal and a receive ready signal are present (Step 404). The receive in progress signal is obtained from the link while the receive ready is received from the DMA arbiter. The receive ready signal indicates whether the any receive DMA engines are ready. If the DMA engines are not ready, the packet is flushed or disposed from the system. If both a receive in progress signal from the link and a receive ready signal are present, the receive DMA (RDMA) is turned on (Step 406) with the arbitration process then returning to step 400. With reference again to step 404, if the receive in progress signal and the receive ready signal are not both present, the process then determines whether an isochronous (ISOC) transmit in progress signal and whether an isochronous (ISOC) transmit ready signal are high (Step 408). The isochronous transmit in progress signal originates from the link while the isochronous transmit ready signal originates from the DMA arbitration engine. If both of these signals are high, an indication is made that the isochronous transmit (IT) engine is turned on (Step 410) with the process then returning to step 400.

If either the isochronous transmit in progress signal or the isochronous transmit ready signal are not high, the process then determines whether an asynchronous transmit in progress signal is set high (Step 412). This signal originates from the link. If the determination is that an asynchronous transmit is not in progress the process then determines whether a physical response ready signal is set high (Step 414). This signal originates from the DMA arbiter. If the physical response ready signal is set high, then the physical response (PR) DMA engine is turned on or selected for processing (Step 416) with the process then returning to step 400.

If the physical response ready signal is not high, a determination is made as to whether the asynchronous transmit response ready signal is set high (Step 418). This signal originates from the DMA arbiter. If the asynchronous transmit response ready signal is set high, then the asynchronous transmit response (ATRs) DMA engine is turned on (Step 420) with the process then returning to step 400.

If the asynchronous transmit response ready signal is not high, then a determination is made as to whether the asynchronous transmit request ready signal is high (Step 422). The asynchronous request ready signal is received from the DMA arbiter. If the asynchronous transmit request ready signal is set high, then the asynchronous transmit request (ATRq) DMA engine is turned on and used to process the packet (Step 424) with the process then returning to step 400. If the asynchronous transmit request ready signal is not set high, then a determination is made as to whether a physical response retry ready signal is set high (Step 426). This signal also is received from the DMA arbiter. If the physical response retry ready signal is set high, then the receive DMA (RDMA) engine is turned on to process the packet (Step 428) with the process then returning to step 400. Otherwise, a determination is made as to whether the asynchronous response retry ready signal is set high (Step 430). This signal is generated by the DMA arbiter. If the asynchronous response retry ready signal is set high, then the asynchronous transmit response DMA is turned on to process the packet (Step 432) with the process then returning to Step 400. If the asynchronous transmit response retry ready signal is not set high, then a determination is made as to whether the asynchronous request retry ready signal is set high (Step 434). If the asynchronous request retry ready signal is set high, then the asynchronous request DMA engine is turned on to process the packet (Step 436) with the process then returning to step 400.

With reference again to step 412, if the asynchronous transmit in progress signal is not set high, then an asynchronous transmit is not in progress and a determination is then made as to whether the receive FIFO is empty (Step 438) This determination is made to determine if the link is idle, meaning the bus is idle or another device is active. If the receive FIFO is not empty, then the receive DMA engine is turned on to process packets (Step 440) with the process then returning to step 400. Otherwise, the process determines whether an isochronous transmit ready signal is set high (Step 442). This signal originates from the DMA arbiter and indicates whether the isochronous transmit DMA engine is ready to process data. If the isochronous transmit ready signal is set high, then the isochronous transmit DMA engine is turned on (Step 444) with the process then returning to step 400. Otherwise, a determination is made as to whether a physical response ready signal is set high (Step 446). This signal originates from the DMA arbiter and indicates whether the physical response DMA engine is ready to process data. If the physical response DMA engine is ready, the process then turns on the physical response DMA engine to process data (Step 448), with the process then returning to step 400. Otherwise, a determination is made as to whether the asynchronous response ready signal is set high (Step 450). This signal originates from the DMA arbiter and indicates whether the asynchronous transmit response DMA engine is ready to process data. If this engine is ready, the engine is selected and turned on to process data (Step 452) with the process then returning to step 400. If, however, the asynchronous transmit response DMA engine is not ready to process data, then a determination is made as to whether the asynchronous transmit request ready signal is set high (Step 454). This signal originates from the DMA arbiter and indicates whether the asynchronous transmit request DMA engine is able to process data. If the answer to this determination is yes, the process then selects the asynchronous transmit request DMA engine to process data (Step 456) with the process then returning to step 400. If the asynchronous transmit request DMA engine is not able to process data, the process then determines whether the physical response retry ready signal is set high (Step 458). If the physical response retry ready signal is set high, then the physical response DMA engine is turned on (Step 460) with the process then returning to step 400.

Otherwise, the process then determines whether the asynchronous transmit response retry ready signal is set high (Step 462). If the asynchronous transmit response retry ready signal is set high, then the asynchronous transmit response DMA engine is turned on (Step 464) with the process then returning to step 400. Otherwise, a determination is made as to whether the asynchronous transmit request retry ready signal is set high (Step 466). This signal originates from the DMA arbiter. If the asynchronous request retry ready signal is set high, then the asynchronous transmit request DMA engine is turned on (Step 468) with the process then returning to step 400.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description but is not limited to be exhaustive or limited to the invention in the from disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for transferring data between busses, comprising:
   (a) in an adapter, receiving a first data packet, in a first context, from a host bus via a host bus interface;
   (b) receiving, in the adapter, a second data packet, in a second context, from the host bus via the host bus interface;
   (c) concurrently processing the first and second data packets; and
   (d) transferring the first and second data packets from the adapter to at least one bus, wherein the first context and second context are different.

2. A method for transferring data between busses, as recited in claim 1 above wherein the first data packet is a data packet of an asynchronous transfer context, and wherein the second data packet is a data packet of an isochronous transfer context.

3. A method for transferring data between busses, as recited in claim 2 above wherein the isochronous transfer context includes isochronous transfer in one of n number of data discrete channel(s) context.

4. A method for transferring data between busses, as recited in claim 2 above wherein the asynchronous transfer context includes asynchronous transfer response data context and request data context.

5. A method for transferring data between busses, as recited in claim 2 above wherein the asynchronous transfer context includes asynchronous transfer response data context or request data context.

6. A method for transferring data between busses, as recited in claim 2 above wherein the step of concurrently processing further includes processing receive context and transmit context.

7. A method for transferring data between busses, as recited in claim 2 above wherein the step of concurrently processing further includes processing receive context or transmit context.

8. A method for transferring data between busses, as recited in claim 1 above wherein the first data packet and the second data packet are received from a host bus.

9. A method for transferring data between busses, as recited in claim 2 above wherein the step of concurrently processing comprises:
   (i) routing the first and second data packets to one of a plurality of processors engines based on the context of the data packet.

10. A method for transferring data between busses, as recited in claim 2 above wherein the step of concurrently processing comprises:
    (i) arbitrating between a plurality of processors; and
    (ii) transferring each of the first and second data packets to one of the plurality of processors.

11. A method for transferring data between busses, as recited in claim 10, above wherein the sub-step of arbitration is based on the availability of a processor for the context of the data packet.

12. A system for transferring data between busses comprising:
    (a) a host bus;
    (b) a second bus;
    (c) an adapter connected between the host bus and the second bus, comprising:
       (i) a plurality of direct memory access (DMA) processors for concurrently processing a plurality of data packets; and
    (d) a single interface for transmission of data between the host bus and the adapter, wherein the single interface receives and transmits data of a first context and a second context, the first context being different from the second context.

13. A system for transferring data between busses as recited above in claim 12, wherein the plurality of DMA processors further comprise:
    (A) at least one DMA processor for processing one of the plurality of data packets in the first context; and
    (B) at least one DMA processor for processing one of a plurality of data packets in the second context.

14. A system for transferring data between busses as recited above in claim 13, wherein the plurality of DMA processors further comprise:
    (A) at least one DMA processor for processing asynchronous transfer context data packets; and
    (B) at least a second DMA processor for processing isochronous transfer context data packets.

15. A system for transferring data between busses as recited above in claims 13, wherein the plurality of DMA processors further comprise:
    (A) n number of DMA processor(s) for processing n isochronous transfer discrete data channels context(s).

16. A system for transferring data between busses as recited above in claim 13, wherein the plurality of DMA processors further comprise:
    (A) at least one DMA processor for processing asynchronous transfer for request data packets context and response data packets context.

17. A system for transferring data between busses as recited above in claim 13, wherein the plurality of DMA processors further comprise:
    (A) at least one DMA processor for processing asynchronous transfer for request data packets context or response data packets context.

18. A system for transferring data between busses as recited above in claim 13, wherein the plurality of DMA processors comprise:
    (A) at least one DMA processor for processing receive context and transmit context.

19. A system for transferring data between busses as recited above in claim 13, wherein the plurality of DMA processors comprise:
    (A) at least one DMA processor for processing receive context or transmit context.

20. A system for transferring data between busses as recited above in claim 12, wherein the adapter simultaneously processes data packets received from the host and second busses.

21. A system for transferring data between busses as recited above in claim 12, wherein the adapter simultaneously processes data packets received from one of the host and second bus and transfers the processed data packets to the other of the host and second bus.

22. A system for transferring data between busses as recited above in claim 12, wherein the adapter further includes:

(i) a router for routing data packets to the plurality of DMA processors.

23. A system for transferring data between busses as recited above in claim 12, wherein the adapter further includes:
   (i) an arbiter for arbitrating between the plurality of DMA processors.

24. A system for transferring data between busses as recited above in claim 21, wherein the arbiter arbitrates between the plurality of DMA processors based on availability of a processor for the context of the data packet.

25. A method for transferring data between busses, comprising:
   (a) receiving a first data packet from a bus;
   (b) routing the first data packet to one of a plurality of processors based on the context of the data packet;
   (c) processing the first data packet with the first processor;
   (d) transferring the first data packet to a bus;
   (e) receiving a second data packet from a bus;
   (f) routing the second data packet to a second of the plurality of processors, based on the context of the second data packet;
   (g) simultaneously to processing the first data packet, processing the second data packet with the second processor; and
   (h) transferring the second data packet to a bus, wherein the first data packet and the second data packet are received via a same interface and wherein the context of the first data packet is different from the context of the second data packet.

26. A method for transferring data between busses, comprising:
   (a) receiving a first data packet in a first context from a bus;
   (b) arbitrating between a plurality of processors based on the availability of processors able to process the first data packet context;
   (c) processing the first data packet with a first processor;
   (d) transferring the first data packet to a bus;
   (e) receiving a second data packet in a second context from the bus;
   (f) arbitrating between a plurality of processors based on the availability of processors able to process the second data packet context;
   (g) simultaneously to the processing of the first data packet, processing the second data packet with a second processor; and
   (h) transferring the second data packet to a bus, wherein the first data packet and the second data packet are received via a same interface and wherein the first data packet context and the second data packet context are different.

27. A method for transferring data between busses, comprising:
   (a) receiving a first data packet from a host bus;
   (b) determining if a DMA engine is ready;
   (c) transferring a data packet to a first ready DMA engine;
   (d) processing the first data packet;
   (e) receiving a second data packet from the host bus;
   (f) determining if a DMA engine is ready;
   (g) transferring the second data packet to a second ready DMA engine;
   (h) processing the second data packet with the second ready DMA engine; and
   (i) transferring the first and second data packets to a bus, wherein the first data packet and the second data packet are received via a same interface and wherein a context of the first data packet is different from a context of the second data packet.

28. A method for transferring data between busses, comprising:
   (a) receiving a plurality of data packets via a single interface;
   (b) determining the transmission mode of each of the plurality of data packets, wherein at least two of the plurality of data packets have different transmission modes from one another;
   (c) routing the plurality of data packets based on transmission mode of the data packets;
   (d) simultaneously processing the plurality of data packets; and
   (e) transferring the plurality of data packets.

* * * * *